Figures 1, 2, 3:
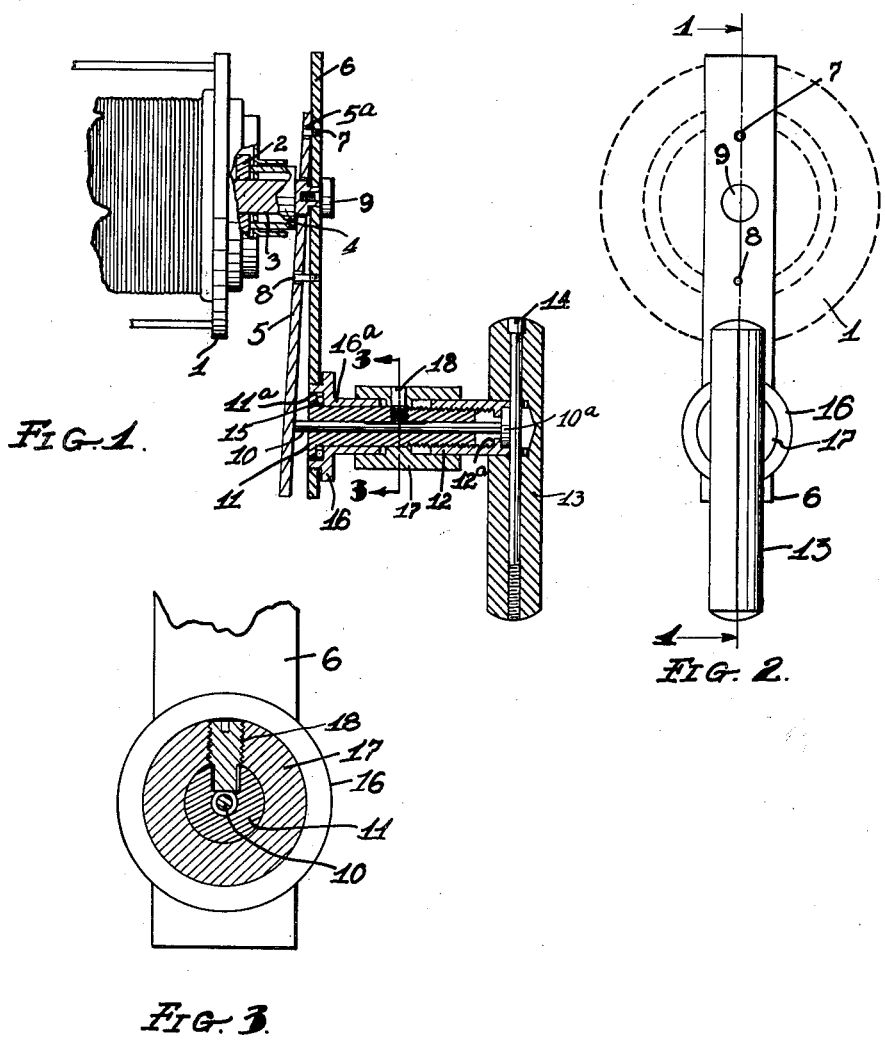

INVENTOR.
FRANK R. BATER
BY A.B. Bowman
ATTORNEY

Patented Apr. 4, 1950

2,502,814

UNITED STATES PATENT OFFICE 2,502,814

FISHING REEL DRAG CONTROL

Frank R. Bater, San Diego, Calif.

Application December 26, 1944, Serial No. 569,742

2 Claims. (Cl. 242—84.5)

My invention relates to a fishing reel drag control, and the objects of my invention are:

First, to provide a means of quickly and accurately adjusting the drag or brake on the reel spool to suit the action of the fish;

Second, to provide a drag control which can be adjusted by the hand which the fisherman is concurrently using to hold the reel handle;

Third, to provide a drag control which can be adjusted to change the braking action while the reel is actually being cranked, in playing a fish, no shifting of the hand from the crank handle being necessary as the thumb and fingers alone control the brake adjustment;

Fourth, to provide a drag control in a fishing reel which can not be overadjusted to the point of loosening the handle from the reel;

Fifth, to provide an improved reel control which can be substituted without special skill or tools for many reel control mechanisms now in use; and Sixth, to attain these objects by a device which is relatively simple in construction and operation and which is sturdy and reliable.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view of my fishing reel taken from a line 1—1 in Fig. 2 and showing portions in elevation to facilitate the illustration; Fig. 2 is an end elevation of the structure shown in Fig. 1; and Fig. 3 is an enlarged vertical sectional view taken on a line 3—3 in Fig. 1 to facilitate the illustration.

Similar characters of reference refer to similar parts and portions throughout the several views of the drawings:

The reel 1 is of conventional type and the brake disc or shoe 2 and reel axis shaft 3 may also be of any standard design. The brake operating spacer sleeve 4 is a hollow cylinder designed to slide over said axis shaft 3 and to transmit the thrust of a contiguous portion of the lever 5 to the brake shoe 2. This lever 5 is loosely secured to turn with the crank arm 6 by guide pins 7 and 8 entered through holes drilled in said lever 5 and screwed into said crank arm 6. The crank arm 6 is fixed to the axis shaft 3 and transmits motion of the crank arm to the reel while the lever 5, turning with the crank arm is free to pivot about a fulcrum point 5a and in so doing move the sleeve 4 and the brake shoe 2 in applying braking action to the reel 1. A button-headed lock screw 9 is used to lock the arm 6 on the axis shaft 3.

The lever 5 is actuated by the plunger 10 which is free to reciprocate within the hollow spindle 11, one end of which is threaded to engage the internally threaded spindle casing 12 which is keyed to the handle 13 by the screwed pin 14. The head 10a of the plunger 10 is locked between said pin 14 and internal flange 12a on said spindle casing 12. The external circular flange 11a is free to turn on the thrust bearing 15 between said flange 11a and the arbor 16 which is threaded into the crank arm 6. A knurled adjusting sleeve 17, free to turn on the shank portion 16a of the arbor 16 and the spindle casing 12, is keyed to the spindle 11 by the pin 18 and when this sleeve 17 is turned relatively to the spindle casing 12, the plunger will be moved relatively to the crank arm 6.

I prefer to provide left hand threads on the spindle 11 and spindle casing 12 and it will be seen that turning the knurled sleeve 17 counterclockwise relative to the handle 13 will then move the plunger 10 so as to force the lever 5 to pivot about its pivot point 5a and push the sleeve 4 towards the reel applying greater braking action to the reel. The reverse movement of the sleeve 17 will release the pressure of the brake.

The plunger 10 has a reduced diameter medial section and the pin 18 is screwed in far enough to contact this pin at the end of this section and thus act as a stop preventing the spindle casing 12 from being accidentally screwed off of the end of the spindle 11.

Though I have shown, and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a fishing rod reel drag control, in combination with a reel having a brake shoe and a crank arm, a lever on said arm adapted to operate said brake by means of a sleeve interposed between said lever and said brake shoe, a spindle rotatably mounted on said arm by means of an arbor screwed into said arm and a thrust bearing between said arbor and a flange on said spindle, a spindle casing threadably engaged with said spindle so that the overall length of spindle and casing can be altered and fitted with a handle, a plunger secured to said casing and adapted to engage said lever, and an adjusting sleeve secured to said spindle by a set screw which also limits the travel of said plunger to the width of a groove cut thereon thus preventing complete unscrewing of the said casing from said spindle.

2. In a fishing rod reel drag control, in combination, a fishing rod reel, an axis shaft for the reel, a brake shoe, a brake shoe actuating sleeve, a crank arm on said shaft, a lever pivotally secured to said crank arm and adapted to actuate said sleeve, an arbor secured in said arm, a hollow spindle rotatably secured in said arbor, a spindle casing threadably engaged with said spindle, a lever actuating plunger slidably mounted within said spindle and secured to one end of said spindle casing, a handle secured to said spindle casing, an adjusting sleeve secured to said spindle by a removable pin which also projects into a wide groove cut in said plunger.

FRANK R. BATER.

REFERENCES CITED

The following references are of record in the file of this patent:

UNITED STATES PATENTS

| Number | Name | Date |
| --- | --- | --- |
| 804,047 | Rockwell | Nov. 7, 1905 |
| 2,363,533 | King | Nov. 28, 1944 |